United States Patent Office 3,433,463
Patented Mar. 18, 1969

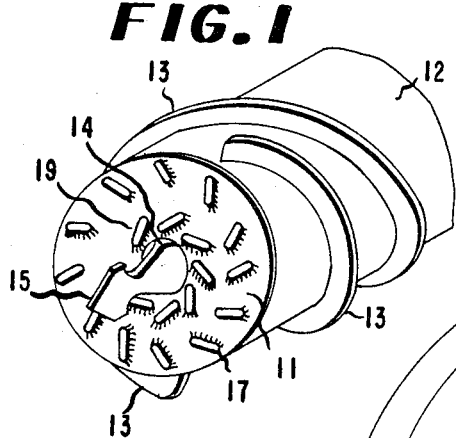
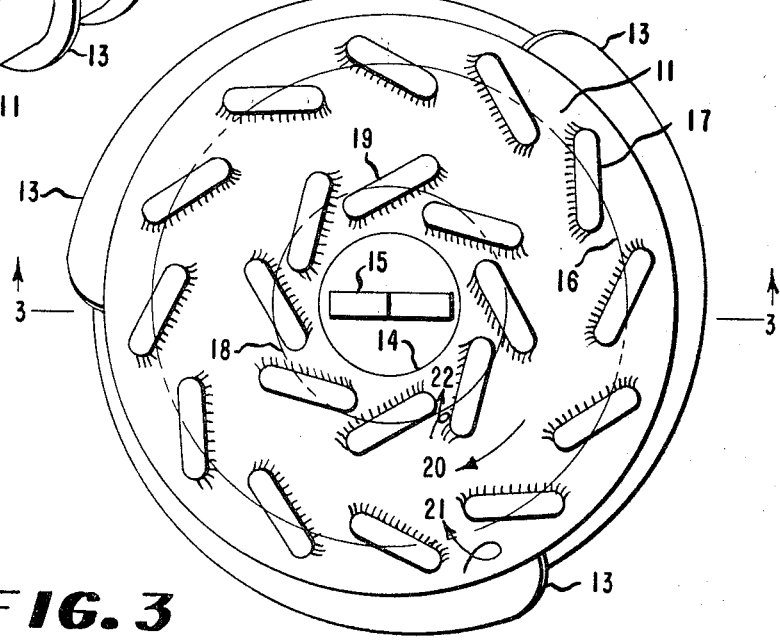
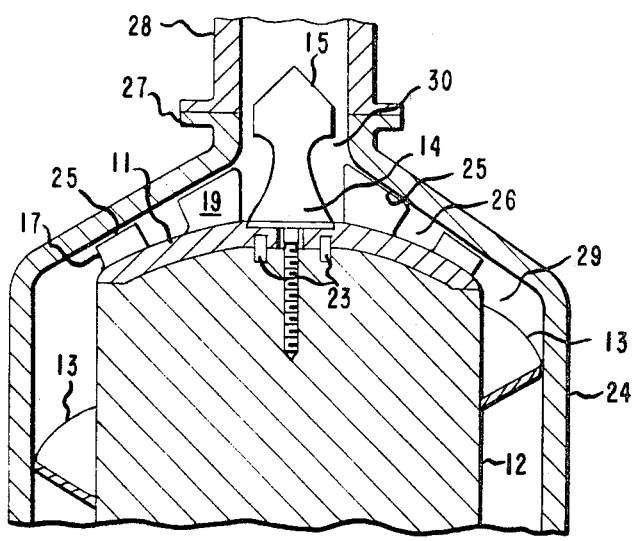

3,433,463
APPARATUS FOR MIXING VISCOUS FLUIDS DISCHARGING FROM A SCREW PUMP
Baden McDowall Pinney, Collins Bay, Ontario, Canada, assignor, by mesne assignments, to E. I. du Pont de Nemours and Company, Wilmington, Del., a corporation of Delaware
Filed Aug. 16, 1967, Ser. No. 661,082
Claims priority, application Canada, Sept. 7, 1966, 969,767
U.S. Cl. 259—7         3 Claims
Int. Cl. B01f 15/02, 7/24; A21c 11/16

ABSTRACT OF THE DISCLOSURE

A method and apparatus for mixing viscous material discharging from one end of a screw pump into an outlet that includes dividing the viscous material into a plurality of streams and rotating the streams by means of a plurality of deflector blades attached to the discharge end of the screw.

BACKGROUND OF THE INVENTION

This invention relates generally to conveying viscous fluids and more particularly, to a method and apparatus for mixing viscous fluids discharging from a screw pump.

The art of melt spinning in which polyamides, polyesters and other synthetic linear polymers are converted into filaments, films and the like has been developed during the past twenty-five years. The molten polymer is conveyed to the spinning block assemblies through jacketed transfer pipe lines at a high temperature and pressure to ensure that the polymer is at the correct molten condition when it reaches the spinning area. One method of imparting a high pressure to the molten polymer is by the use of a screw pump or extruder of single or multiple screw design.

The polymerized material is either melted before entering the screw pump or enters the extruder as a dry solid material, and is melted by the heat produced from the friction of compressing and kneading the solid material. In both cases, the temperature of the polymer in the screw pump increases due to adiabatic compression and heat buildup through slippage. The barrel of the pump is normally surrounded by a jacket containing a liquid coolant which cools the polymer in direct contact with the barrel. Due to poor diffusion rates, however, the polymer not in contact with the barrel whilst flowing through the screw pump is discharged at a higher temperature. Thus a considerable temperature gradient is formed across the molten polymer discharge from the pump.

In the case of some molten polymers, such as nylon, a certain amount of degrading or increase in molecular weight is continually occurring but it has been found that this degrading increases appreciably at higher temperatures. To overcome an undesirable wide range of molecular weight distribution, it is recognized that there is a need to conduct the process of melt spinning under such conditions as to impart a uniform thermal history to all the molten polymer delivered to the spinning block assemblies.

The expression "thermal history" as used herein refers to a quality which takes into account both the temperature to which a given sample of molten polymer has been subjected in passing from one specified point to another and the time of exposure of such sample to said temperature, it being understood that the temperature does not necessarily have to be constant. For instance, if the temperature is allowed to vary with time, equal thermal history for a given group of streamlets in a transfer pipeline can still be achieved, provided each is exposed to the same variations, and the exposure is for the same length of time at each temperature value. In other words, the history of each streamlet is represented by the same temperature and time curve.

Another problem that occurs with the polymer screw pump is the buildup of small amounts of solid degraded polymer known as gel on the inside of the discharge flanges of the pump and in stagnant areas at the nose of the screw. The gel bonds to the surfaces of the pump and builds up until it adversely affects the process by contaminating the polymer stream.

It is an object of this invention to provide an apparatus and a method for reducing the temperature gradient across the molten polymer discharge from a screw pump.

It is a further object to provide an apparatus for reducing the buildup of gel at the discharge of a screw pump and on the nose of the screw.

It is a still further object to provide an apparatus and a method to eliminate the need of an external mixer for molten polymer discharging from a screw pump.

SUMMARY OF THE INVENTION

In accordance with the present invention, there is provided a device for mixing a viscous fluid discharging from the end of a screw pump comprising: a plurality of deflector blades evenly spaced in at least one ring and mounted on a nose cone plate adapted to divide said viscous fluid into a plurality of streams and rotate said viscous fluid in each of said streams, and an annular space downstream of said ring of deflector blades adapted to join said plurality of streams of viscous fluid.

Also there is provided a method of mixing a molten polymer discharging from the end of a screw pump comprising the steps of: dividing the flow of molten polymer into a plurality of streams with at least one ring of deflector blades, rotating the molten polymer in each of said streams, shearing said streams of molten polymer discharging from said ring of deflector blades, and joining said streams of molten polymer.

BRIEF DESCRIPTION OF THE DRAWINGS

FIGURE 1 is a perspective view showing one embodiment of the nose cone mixer mounted on the end of a screw pump.

FIG. 2 is an end view showing the two rings of deflector blades on one embodiment of the nose cone mixer.

FIG. 3 is a cross sectional view taken on the section 3—3 of FIG. 2, illustrating the nose cone mounted on the screw pump inside the outlet housing.

DETAILED DESCRIPTION OF THE PREFERRED EMBODIMENT

Figure 4:
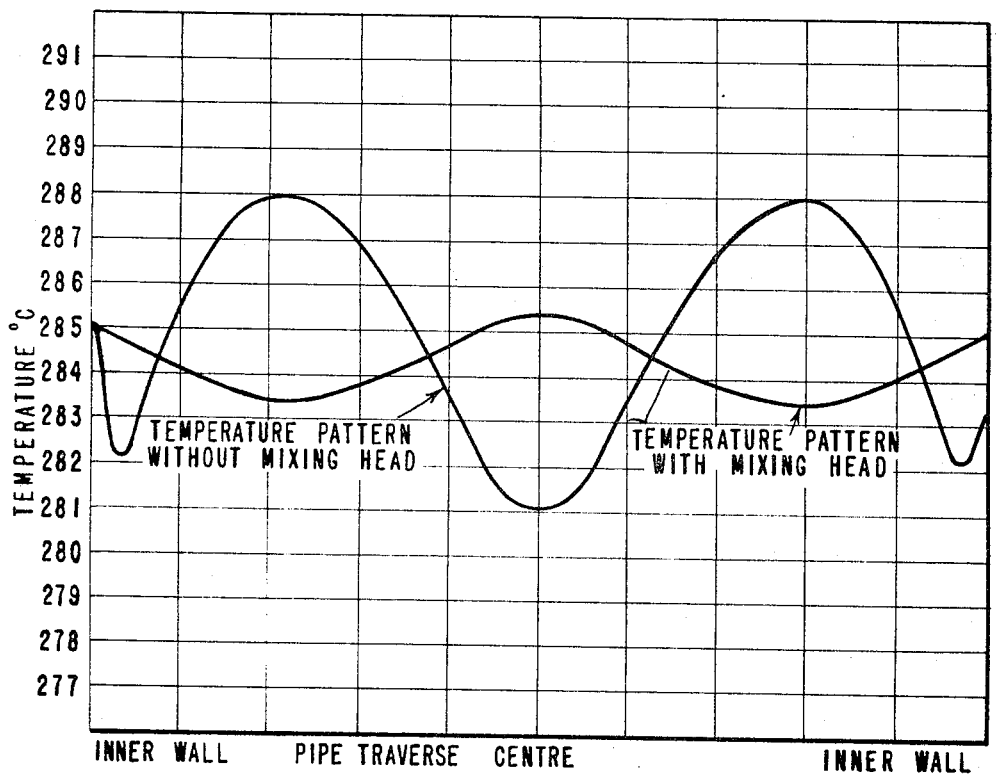
FIG. 4 is a graph of typical results of tests showing the comparative temperature gradients across the molten polymer discharging from a screw pump with and without the nose cone mixer.

Referring to FIGS. 1 and 2, the nose cone plate 11 is mounted on the end of a screw pump shaft 12. Three flights 13 are shown on the screw pump shaft 12. The cone 11 is held in place by means of a special attachment bolt 14, streamlined to reduce buildup of gel in stagnant areas, and with a mixing blade 15 to give a final mix to the molten polymer as it enters the transfer pipe line. Although the mixing blade 15 aids this invention, it may be omitted without affecting the mixing greatly. An outer ring 16 of twelve deflector blades 17 spaced evenly apart, and directed in towards the centre point of the cone 11 in the direction of rotation is attached to the cone 11. An inner ring 18 of eight deflector blades 19 spaced evenly apart and directed away from the centre point of the cone 11 in the direction of rotation is also attached to the cone 11. The direction of rotation is in direction of arrow identified by number 20. The polymer flowing through outer ring 16 of deflector blades 17 follows the direction of arrow identified by number 21 and the polymer flowing through the inner ring 18 of deflector blades 19 follows the direction of arrow identified by number 22.

The nose cone plate 11 is located on the end of the screw shaft 12 with two spigots 23 as shown in FIG. 3. The outlet housing 24 surrounds the nose cone plate 11, leaving a small gap 25 between the deflector blades 17 and 19 and the housing 24. An annular space 26 exists between the inner ring 18 and outer ring 16 and a shear area 29 exists between the outer ring 16 and the screw pump flights 13. The outlet housing 24 ends at a discharge flange 27, where it is connected to the transfer pipeline 28, and an exit area 30 exists between the inner ring 18 and the discharge flange 27.

In operation, the molten polymer discharges from the three screw pump flights 13 in three segmental streams which are rotating within themselves due to flight action. The boundary layers of polymer are colder than the core due to the barrel of the pump being cooled with liquid Dowtherm[1] at about 260° C. and poor diffusion rates in the polymer. After entering the shear area 29 between the screw pump flights 13 and the outer ring 16 of deflector blades 17, the three segmental streams form one and the cool interfaces between adjacent streams are destroyed by shear action. An annular temperature pattern results with colder boundary layers on the screw shaft 12 and the outlet housing 24. If no mixing nose cone is used, it is found that this pattern is maintained in the transfer line due to lamina flow and poor diffusion rates. This causes uneven thermal history for the polymer arriving at the spinning block assemblies.

With the nose mixing cone, however, the annular flow from the shear area 12 is split into twelve streams by the outer ring 16 of deflector blades 17. Rotation in each stream is induced as indicated by arrow 21 and some of the hotter polymer from the centre is moved to the outside edge of the streams. Twelve new interfaces appear at the exit from the outer ring 16. In the annular space 26 between the inner ring 18 and outer ring 16, shear is again applied across the whole melt flow and the twelve interfaces are smeared. In the passage through the inner ring 18 of deflector blades 19, the molten polymer is divided into eight streams and rotation again occurs within each stream. Shearing occurs across the whole melt flow as it passes into the exit area 30 and the eight interfaces are again smeared. A final blending is given to the molten polymer as it enters the transfer pipe line 28 by the mixing blade 15 of the special attachment bolt 14.

Whereas molten polymer has been described in this embodiment of the invention, it is not intended to restrict the mixing device to molten polymers. In fact, any viscous fluid with a viscosity of over 200 poises would mix in the manner herein described. The preferred molten polymers for use with this device are gel forming polymers such as polyamides, but others such as polyesters, polyethylenes and polyacrylonitrile may also be used.

The mixing device does not impose a violent dispersing action on the molten polymer, but rather a folding effect to obtain thinner striations of polymer with differing temperatures. Although poor diffusion rates occur in the molten polymer, it has been found that a more even temperature gradient is obtained at the outlet of the transfer pipe line, and thus the polymer arrives at the spinning block assemblies with a uniform thermal history.

Due to the increased polymer velocities around the nose cone mixer, few, if any, stagnant areas exist, and it is found that the deposit of gel is greatly reduced on the nose cone plate 11 and the inner walls of the outlet housing 24.

Due to the gap 25 between the deflector blades 17 and 19 and the housing 24 which is relatively large compared to the gap between the flights 13 and the barrel, the short length of the deflector blades 17 and 19 and the configuration of the radial blading, this device cannot be considered to aid pumping. There may be a slight pumping effect due to elastic melt extrusion but this and centrifugal effects are considered negligible.

The pressure drop through the nose cone mixer consists of friction losses due to flow through the deflector blades 17 and 19, and losses due to entrance and exit effects. These friction losses bear a relationship to the annular cross sectional area and the polymer velocity and it is found in practice that the total pressure drop is small in comparison with the total transfer pipe line differential.

The power absorbed by the nose cone mixer appears as an increase in melt temperature. This energy is used to apply shearing forces in the polymer, but the amount of shear is only slightly greater than that currently generated between the nose of the screw pump and the discharge flange 27 without the nose cone mixer being present. This increase in temperature is controlled with the Dowtherm jacket cooling on the barrel of the screw pump and the transfer pipe line.

Whereas one embodiment of the invention has been described, other embodiments where the number of deflector blades, and the rings of deflector blades mounted on the cone may be more or less than those herein described are considered part of this invention. Furthermore, the deflector blades may be differently shaped and mounted on the wall of the outlet housing, instead of the nose cone, to give the required swirling effect to the divided streams of polymer.

In a further embodiment, the nose cone plate may be replaced by a flat nose plate, whose surface is perpendicular to the screw shaft 12. One or more rings of deflector blades are mounted on the plate to divide the polymer into a plurality of streams and blend the polymer as herein described.

*Example*

A nose cone mixer is attached to a screw pump for pumping molten polyhexamethylene adipamide. The mixer is fabricated from a high quality fully deoxidized steel, and the deflector blades are welded in place with low hydrogen welding rods as a precaution against embrittlement. After welding, the mixer is stress relieved and then machined. On assembly, it is found that the end of the screw pump shaft is not machined very accurately and high temperature cement is used to fill any voids and eliminate the gap at the peripheral joint.

Clearances between deflector blade tips and the outlet housing are checked cold and hot before the discharge line is bolted in place. With the flange bolted up and the special attachment bolt removed, measurements are made using a feeler gauge. It is found that end clearance drops by approximately 0.007 inch from cold to hot due to differential expansion between the barrel and the screw. Satisfactory clearances are obtained in the first assembly so that no adjustments are necessary.

The polymer enters the screw pump at approximately 285° C. and the barrel is cooled with liquid Dowtherm at approximately 260° C. A movable thermocouple assembly is installed in the transfer pipe line close to the discharge flange from the screw pump, and comparative temperature traverses are carried out with and without the nose cone mixer. Typical results of these traverses are shown in FIG. 4 indicating the temperature gradients across the pipe line. It is found that the maximum temperature differential is reduced to 2° C. from a previous 8 to 10° C. with the installation of the nose cone mixer.

With more even temperatures obtained at the screw pump discharge, it is found that the liquid Dowtherm temperature on the screw pump barrel can be optimized for the transfer line temperature required. In this case, for 285° C. transfer line operation, 264° C. liquid Dow- ---
[1] Registered trademark.

therm screw for pump cooling is found to give best results with respect to temperature uniformity.

With the installation of the nose cone mixer, the polymer temperatures at the spinning block assemblies are found to be within ±½° C. Previous differences of 6 to 8° C. were recorded. These results indicate that the mixing head achieves the desired effect of blending the polymer sufficiently to obtain uniform thermal history for the polymer at the spinning block assemblies.

The nose cone mixer also reduces the gel deposit at the screw pump outlet flange due to the wiping effect of the mixing blades and the higher polymer velocities induced. Gel thicknesses are reduced from about ¼ inch to practically nothing. Gel deposits on the nose of the screw are also greatly reduced.

What is claimed is:

1. In a screw pump for viscous material that includes an elongated rotatably driven screw and a housing surrounding the screw and provided with a materials outlet adjacent one end of the screw, a device for mixing viscous material discharging from said one end of the screw, said device comprising:

a plurality of deflector blades attached to said one end of the screw, said blades being spaced in outer and inner concentric rings about the center of said one end, the blades in the outer ring being directed inwardly toward the center of said one end in the direction of rotation of said screw, the blades in the inner ring being directed outwardly from the center of said one end in the direction of rotation of said screw, said blades being adapted to divide said material into a plurality of streams and rotate said viscous material in each of said streams before said streams are joined in said outlet.

2. The apparatus of claim 1 wherein is provided an elongated mixing blade attached to the center of said one end, said blade projecting longitudinally into said outlet and being adapted to mix said streams as they are joined in said outlet.

3. An apparatus for mixing viscous fluids comprising:
 (a) an elongated rotatably driven screw;
 (b) a housing surrounding the screw and provided with a fluid outlet adjacent one end of the screw;
 (c) a plate connected to and concentric with said one end of the screw;
 (d) a plurality of deflector blades attached to said plate, said blades being spaced in outer and inner rings about the center of the plate, the blades in the outer ring being directed inwardly toward the center of the plate in the direction of rotation of the screw, the blades in the inner ring being directed outwardly from the center of the plate in the direction of rotation of said screw, said blades being adapted to divide said fluid into a plurality of streams and rotate said fluid streams before said streams are joined in said outlet; and
 (e) an elongated mixing blade attached to said plate, said blade being centered on said plate and projecting longitudinally into said outlet and being adapted to mix said streams as they are joined in said outlet.

References Cited
UNITED STATES PATENTS

| 2,705,131 | 3/1955 | Ross et al. | 259—25 |
| 2,732,587 | 1/1956 | Greene. | |
| 3,171,160 | 3/1965 | Moyer. | |

WALTER A. SCHEEL, *Primary Examiner.*

JOHN M. BELL, *Assistant Examiner.*

U.S. Cl. X.R.

18—12; 107—14